(12) United States Patent
Liu et al.

(10) Patent No.: US 10,256,637 B2
(45) Date of Patent: Apr. 9, 2019

(54) METHOD AND DEVICE OF DETERMINING A REFERENCE OUTPUT POWER FOR AN ENERGY STORAGE SYSTEM IN A WIND POWER GENERATION SYSTEM

(71) Applicant: ABB Schweiz AG, Baden (CH)

(72) Inventors: Yuan Liu, Hubei (CN); Hailian Xie, Beijing (CN); Chengyan Yue, Beijing (CN)

(73) Assignee: ABB Schweiz AG, Baden (CH)

( * ) Notice: Subject to any disclaimer, the term of this patent is extended or adjusted under 35 U.S.C. 154(b) by 607 days.

(21) Appl. No.: 14/777,066

(22) PCT Filed: Jun. 27, 2014

(86) PCT No.: PCT/CN2014/081035
§ 371 (c)(1),
(2) Date: Sep. 15, 2015

(87) PCT Pub. No.: WO2015/196482
PCT Pub. Date: Dec. 30, 2015

(65) Prior Publication Data
US 2016/0181811 A1 Jun. 23, 2016

(51) Int. Cl.
*H02J 1/10* (2006.01)
*H02J 3/38* (2006.01)
(Continued)

(52) U.S. Cl.
CPC ............ *H02J 3/386* (2013.01); *F03D 7/0284* (2013.01); *F03D 9/11* (2016.05); *H02J 3/28* (2013.01);
(Continued)

(58) Field of Classification Search
CPC .... H02J 3/28; H02J 3/32; H02J 3/386; H02H 3/386; Y02E 10/763; F03D 9/11; F03D 7/00; F03D 7/0284
See application file for complete search history.

(56) References Cited

U.S. PATENT DOCUMENTS

| 8,227,929 B2 | 7/2012 | Burra et al. | |
| 2004/0207207 A1* | 10/2004 | Stahlkopf | H02J 3/32 290/44 |

(Continued)

FOREIGN PATENT DOCUMENTS

| CN | 102522763 A | 6/2012 |
| CN | 102522776 A | 6/2012 |

(Continued)

OTHER PUBLICATIONS

ISA/CN International Search Report dated Mar. 27, 2015 re PCT Application No. PCT/CN2014/081035, filed Jun. 27, 2014.
(Continued)

*Primary Examiner* — Hal Kaplan
*Assistant Examiner* — Rasem Mourad
(74) *Attorney, Agent, or Firm* — Taft Stettinius & Hollister LLP

(57) ABSTRACT

Embodiments of the present disclosure relate to a method and system for determining a reference power for an energy storage system (ESS) in a wind power generation system. In an embodiment of the present disclosure, the method comprises filtering an actual wind power output to obtain a desired power output delivered to a grid; determining a reference output power for the energy storage system from the actual wind power output and the desired power output delivered to the grid; and adjusting the reference output power for the energy storage system based on a change in predicted wind power output at the next time point. With embodiments of the present disclosure, it can provide a (Continued)

direct control strategy for smoothing wind farm output fluctuations and limiting power ramping rate within required range, which is more practically feasible than the existing strategies and could result in better control performance.

16 Claims, 10 Drawing Sheets

(51) Int. Cl.
  *H02J 3/28*   (2006.01)
  *F03D 7/02*   (2006.01)
  *F03D 9/11*   (2016.01)
  *H02J 3/32*   (2006.01)
  *H02J 7/34*   (2006.01)
  *H02J 3/00*   (2006.01)

(52) U.S. Cl.
  CPC ............... *H02J 3/32* (2013.01); *H02J 7/34* (2013.01); *F05B 2270/1033* (2013.01); *H02J 2003/007* (2013.01); *Y02E 10/723* (2013.01); *Y02E 10/763* (2013.01); *Y02E 10/766* (2013.01); *Y02E 60/76* (2013.01); *Y02E 70/30* (2013.01); *Y04S 40/22* (2013.01)

(56) References Cited

U.S. PATENT DOCUMENTS

| | | | | |
|---|---|---|---|---|
| 2009/0295162 | A1* | 12/2009 | Oohara | F03D 7/028 290/44 |
| 2011/0273129 | A1* | 11/2011 | Coe | H02J 7/007 320/101 |
| 2012/0153726 | A1 | 6/2012 | Moon | |
| 2014/0172182 | A1* | 6/2014 | Subbotin | H02J 3/383 700/291 |
| 2014/0191581 | A1* | 7/2014 | Inuzuka | H02J 3/382 307/80 |
| 2015/0154504 | A1* | 6/2015 | Zhang | G06N 7/005 706/52 |

FOREIGN PATENT DOCUMENTS

| | | | |
|---|---|---|---|
| CN | 102593854 A | * | 7/2012 |
| CN | 102664422 A | | 9/2012 |

OTHER PUBLICATIONS

Third Office Action dated Mar. 19, 2018 in corresponding Chinese application No. 201480007432.3 (12 pages).
Extended European Search Report, European Patent Application No. 14885843.4, dated Nov. 3, 2017, 7 pages.
First Chinese Office Action, Chinese Patent Application No. 201480007432.3, dated Dec. 23, 2016, 12 pages with English Language translation.
Chinese Search Report, Chinese Patent Application No. 201480007432.3, dated Dec. 23, 2016, 2 pages.
Second Chinese Office Action, Chinese Patent Application No. 201480007432.3, dated Sep. 6, 2017, 12 pages with English Language translation.
Xiangjun Li, Dong Hui, Xaiokang Lai, Minggao Ouyon, Young Min, Department of Electrical Engineering, China Electric Power Research Institute, Beijing, China, Fuzzy Logic Based Coordinated Controller for Wind/Battery/IDSMS Hybrid Micro-grid Power System, 2010 2nd International Conference on Computer Engineering and Technology, vol. 4, pp. 264-267.
Xiangjun Li, Nan Li, Xuexui Jia, Dong Hui, Electrical Engineering and New Material Department, China Electric Power Research Institute, China, Fuzzy Logic Based Smoothing Control of Wind/PV Generation Output Fluctuations with Battery Energy Storage System, 5 pages.
Guiping Wang, Panpan Yang, Jinjin Zhang, Fuzzy Optimal Control and Simulation of Battery-Ultracapacitor Dual-Energy Source Storage System for Pure Electric Vehicle, Aug. 13-15, 2010, International Conference on Intelligent Control and Information Processing, Dalian, China, p. 555-560.
Yu Hang, Dissertation for the Master's Degree in Engineering, Simulation Research on Smoothing the Wind Power Fluctuation by Using Energy Storage System, Mar. 2010, 56 pages; Statement of Relevance: The method using filter can smooth the output variation but does not pay attention to the SOC control of the battery and always need a relatively high energy capacity.
Li Wen-bin, Lu Ji-ping, Xu Bing, Xie Ying-zhao, Yin Yuan, Liu Gang, Selection of Energy Storage Capacity to Suppress the Wind Power Fluctuation, Mar. 2012, China Academic Journal Electronic Publishing House, vol. 40, p. 0439-0444; Statement of Relevance: The method using filter can smooth the output variation but does not pay attention to the SOC control of the battery and always need a relatively high energy capacity.
Yu Hang, Zhang Zhenqing, Yuan Tianfen, Huang Yanfeng, The Relationships Between the Efficiency of Stabilizing Wind Power Fluctuations and Capacity of Storage System, Nov. 2009, 4 pages; Statement of Relevance: The method using filter can smooth the output variation but does not pay attention to the SOC control of the battery and always need a relatively high energy capacity.
Liu Xia, Jiang Quanyuan, An Optimal Coordination Control of Hybrid Wind/ Photovoltaic / Energy Storage System, Jul. 25, 2012, China Academic Journal Electronic Publishing House, vol. 36, p. 95-100; Statement of Relevance: The method to combine the pitch angle control and ESS can raise the flexibility of the whole system but will reduce efficiency of the wind turbines for they will not be controlled using MPPT strategy.
D.L. Yao, S.S. Choi, K.J. Tseng, T.T. Lie, A Statistical Approach to the Design of a Dispatchable Wind Power-Battery Energy Storage System, IEEE Transactions on Energy Conversion, vol. 24, No. 4, Dec. 2009, p. 916-925.
Ding Ming, Xu Ningzhou, Bi Rui, Modeling of BESS for Smoothing Renewable Energy Output Fluctuations, Automation of Electic Power Systems, vol. 35, No. 2, Jan. 25, 2011, pp. 66-72; Statement of Relevance: The optimization method have been developed on the scheduling level. However, few methods mentioned above have considered the direct control of power ramping rate and they don't use the forecasted wind condition information to improve the overall performance of the wind power and BESS system.
Sercan Teleke, Mesut E. Baran, Subhashish Bhattacharya, Alex Q. Huang, Optimal Control of Battery Energy Storage or Wind Farm Dispatching, IEEE Transactions on Energy Conversation, vol. 25, No. 3, Sep. 2010, pp. 787-794.
Ted K. A. Krekken, Alex Yokochi, Annette von Jouanne, Zuane Z. Yen, Hannes Max Hapke, Douglas A. Halamay, Optimal Energy Storage Sizing and Control for Wind Power Applications, IEEE Transactions on Sustainable Energy, vol. 2, No. 1, Jan. 2011, p. 69-77.
M. Khalis, A.V. Savkin, A Model Predictive Control Approach to the Problem of Wind Power Smoothing with Controlled Battery Storage, Renewable Energy 35, 2010, p. 1520-1526.
Mohmmad Taghi Zareifard, Andrey V. Savkin, Model Predictive Control for Wind Power Generation Smoothing with Controlled Battery Storage Based on a Nonlinear Battery Mathemalical Model, IEEE, 2015, 6 pages.
Wen Yi, Zhang Bu-Han, Mao Cheng-xiong, Wang Kui, Mao Biao, Zeng Jie, Chen Xun, The Power and Capacity's Optimized Allocation of Energy Storage Device in Wind Farm, China Academic Jounal Electronic Publishing House, vol. 27, No. 1, Jan. 2012, 4 pages.
Indian Examination Report, Indian Application No. 5809/CHENP/2015, dated Dec. 27, 2018, 5 pages.

* cited by examiner

METHOD AND DEVICE OF DETERMINING A REFERENCE OUTPUT POWER FOR AN ENERGY STORAGE SYSTEM IN A WIND POWER GENERATION SYSTEM

FIELD OF THE INVENTION

Embodiments of the present disclosure generally relate to a technical field of wind power generation control, and more particularly relate to a method and device of determining a reference power for an energy storage system (ESS) in a wind power generation system.

BACKGROUND OF THE INVENTION

Nowadays, wind energy has drawn more and more attentions because of being a clean inexhaustible energy and the wind power penetration level is constantly increasing all over the world. However, due to the fact that wind power has characteristics such as random fluctuations, intermittence, etc., integration of a large-scale wind power might worsen the grid stability and power quality. To improve controllability of power energy output, energy storage technology is usually used in combination with the wind power generation. For example, in many applications, an energy storage system (ESS) is used to facilitate wind power to meet grid code requirements.

At the same, many control strategies for the ESS have been developed. One known strategy is based on Fuzzy-Logic based adaptive regulator (FLAR) but its membership function is hard to choose. A filter based approach can smooth the wind power output variation but it always needs a relatively high energy capacity. A method combining both the pitch angel control and the ESS can offer a higher flexibility of the whole system but it will reduce the efficiency of the wind turbines due to the Maximum Power Point Tracking strategy cannot be used any more. The double battery energy storage system (BESS) strategy, which uses two parallel battery energy storage systems, could decouple the charging and discharging processes of batteries; however, the control of the conversion time is highly demanding. Besides, some other optimization methods have also proposed on the scheduling level.

In addition, in Chinese patent application No. CN102664422A, there is disclosed a method for smoothing the wind farm output which modifies the wind farm output by using wind power prediction and uses an improved adaptive filtering approach to filter the modified wind farm output.

SUMMARY OF THE INVENTION

In the present disclosure, there is provided a new solution for determining a reference power for an energy storage system (ESS) in a wind power generation system so as to solve or at least partially mitigate at least a part of problems in the prior art.

According to a first aspect of the present disclosure, there is provided a method of determining a reference output power for an energy storage system in the wind power generation system. The method comprises filtering an actual wind power output to obtain a desired power output delivered to a grid; determining a reference output power for the energy storage system from the actual wind power output and the desired power output delivered to the grid; and adjusting the reference output power for the energy storage system based on a change in predicted wind power output at the next time point.

In an embodiment of the present disclosure, the adjusting the reference output power for the energy storage system based on a change in predicted wind power output at the next time point may comprise any one of: increasing the reference output power for the energy storage system if an increase in the predicted wind power output is larger than a predetermined increase threshold; and decreasing the reference output power for the energy storage system if a decrease in the predicted wind power output is larger than a predetermined decrease threshold.

In another embodiment of the present disclosure, the increasing the reference output power for the energy storage system may further comprise determining the reference output power for the energy storage system as the difference between the minimum of the maximum allowable total power outputs under power output ramping rate limit and under energy storage system output power amplitude limit and the actual wind power output.

In a further embodiment of the present disclosure, the decreasing the reference output power for the energy storage system may further comprise determining the reference output power for the energy storage system as the difference between the maximum of the minimum allowable total power outputs under power output ramping rate limit and under energy storage system output power amplitude limit and the actual wind power output.

In a still further embodiment of the present disclosure, the method may further comprise adjusting the reference output power for the energy storage system based on a ramping rate limit.

In a yet further embodiment of the present disclosure, the adjusting the reference output power for the energy storage system based on a ramping rate limit may further comprise determining the reference output power for the energy storage system as the difference between the maximum of the minimum allowable total power outputs under one-minute power output ramping rate limit, ten-minute power output ramping rate limit and energy storage system output power amplitude limit and the actual wind power output if a negative ramping rate boundary crossing is detected.

In a still yet further embodiment of the present disclosure, the adjusting the reference output power for the energy storage system based on a ramping rate limit may further comprise determining the reference output power for the energy storage system as the difference between the minimum of maximum allowable total power outputs under one-minute power output ramping rate limit, ten-minute power output ramping rate limit and energy storage system output power amplitude limit and the actual wind power output if a positive ramping rate boundary crossing is detected.

In another embodiment of the present disclosure, modifying, before adjusting the reference output power for the energy storage system, the reference output power for the energy storage system with a power value h(t) expressed by $$h(t)=1/T[E(t)-E_{Bn}m_1-\alpha TP_{set}(t)]$$

wherein T denotes a filter time constant for filtering the actual wind power output, E(t) denotes energy remaining in the energy storage system at time t, $E_{BN}$ denotes the rated capacity of the energy storage system, m1 denotes the minimum energy percentage limitation, α denotes a batter energy limit factor, and $P_{set}(t)$ denotes the obtained desired power output delivered to the grid.

In a further embodiment of the present disclosure, the method may further comprise limiting the reference output power for the energy storage system within output power amplitude limitation of the energy storage system.

According to a second aspect of the present disclosure, there is further provided a device for determining a reference output power for an energy storage system in the wind power generation system. The system comprises a power output filtering unit configured to filter an actual wind power output to obtain a desired power output delivered to a grid; a reference power determination unit configured to determine a reference output power for the energy storage system from the actual wind power output and the desired power output delivered to the grid; and a power prediction adjustment unit configured to adjust the reference output power for the energy storage system based on a change in predicted wind power output at the next time point.

According to a third aspect of the present disclosure, there is further provided a computer-readable storage media with computer program code embodied thereon, the computer program code configured to, when executed, cause an apparatus to perform actions in the method according to any embodiment in the first aspect of the present disclosure.

According to a fourth aspect of the present disclosure, there is provided a computer program product comprising a computer-readable storage media according to the third aspect of the present disclosure.

In embodiments of the present disclosure, before performing any adjustment, the actual wind power output is first filtered to obtain a desired power output delivered to a grid; based on the actual wind power output and the desired reference power output, the reference output power for the energy storage system is determined; and afterwards the reference output power for the energy storage system is adjusted based on a change in predicted wind power output at the next time point. In some embodiments, the reference output power for the energy storage system may be further adjusted based on other factors. In this way, it can provide a direct control strategy for smoothing wind farm output fluctuations and limiting power ramping rate within a required range, which is more practically feasible than the existing strategies and could result in better control performance.

BRIEF DESCRIPTION OF THE DRAWINGS

The above and other features of the present disclosure will become more apparent through detailed explanation on the embodiments as illustrated in the description with reference to the accompanying drawings, throughout which like reference numbers represent same or similar components and wherein.

DETAILED DESCRIPTION OF EMBODIMENTS

Hereinafter, solutions as provided the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Next, reference will be made to FIG. 1 to describe a method for determining a reference power for an ESS in a wind power generation system according to an embodiment of the present disclosure.

Figure 1:
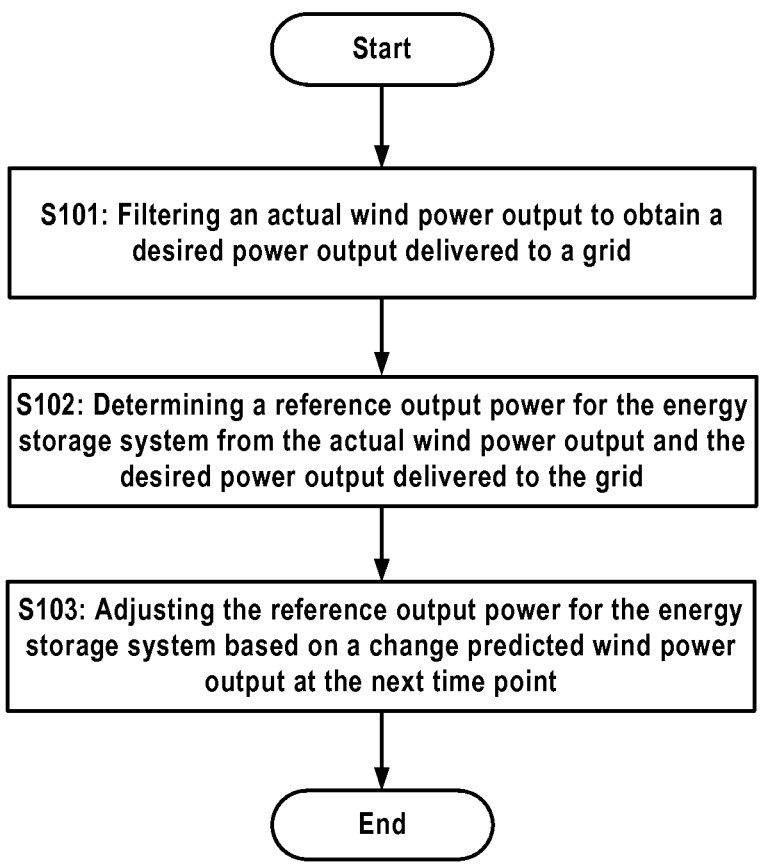
FIG. 1 schematically illustrates a flow chart of a method for determining a reference output power for an ESS in a wind power generation system according to an embodiment of the present disclosure.
Figure 2:
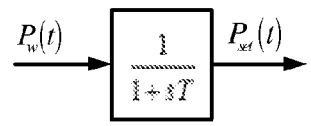
FIG. 2 schematically illustrates a block diagram of output power filter unit according to an embodiment of the present disclosure.

As illustrated in FIG. 1, first at step S101, an actual wind power output is filtered to obtain a desired power output delivered to a grid. In this operation, a filter is used to smooth out minute-scale wind power fluctuation in actual wind output power $P_w(t)$, so as to obtain a smoothed output power value, i.e., $P_{set}(t)$, a desired value for power delivered to the grid from wind farm and the ESS. The filter can be any known filter in the art but in an embodiment of the present disclosure, a first order low-pass filter is used, the diagram of which is illustrated in FIG. 2 only for a purpose of illustration. Through Laplace transform, the smoothed power value from the filter may be represented by $$P_{set}(s) = \frac{1}{1+sT}P_w(s) \quad \text{(Equation 1)}$$

Wherein $P_{set}(s)$ denotes the reference power output delivered to the grid expressed in s domain and $P_w(s)$ denotes the actual wind output power expressed in s domain, and T denotes the smoothing or filter time constant.

The smoothing effect depends on the smoothing time constant T. Generally, the higher the smoothing time constant T is, the smoother the output power will be and more ESS capacity is needed, which means higher cost will be needed. The smoothing time constant T may be decided by for example the BESS rated capacity $E_{Bn}$ and wind farm rated power $P_{Wn}$. In an embodiment of the present disclosure, T may be calculated as $$T = \frac{E_{Bn}}{P_{Wn}} \quad \text{(Equation 2)}$$

After obtaining $P_{set}(t)$, the reference power output delivered to the grid, at step S102, a reference output power for the energy storage system is determined from the actual wind power output and the reference power output delivered to the grid. The reference output power $P_{Bref1}(t)$ for the energy storage system may be calculated as the difference between the actual wind output power $P_w(t)$ and the reference power output $P_{set}(t)$ delivered to the grid, which means the energy storage system should provide the reference output power $P_{Bref1}(t)$ in addition to wind power $P_w(t)$ provided by the wind farm so that the wind power generaion system (i.e., the wind farm together with the BESS) could deliver a combined power output of $P_{set}(t)$ to the grid. This reference output power $P_{Bref1}(t)$ is an initial reference output power, which will be further modified subsequently.

For example, the reference output power $P_{Bref1}(t)$ may be first adjusted by SOC (state of charge)-feedback control.

The SOC-feedback control is mainly for limiting the SOC variation within a permitted level to avoid over-charge and over-discharge and get the desired 'smoothed power' from the filter. Hereinafter, description will be made to the SOC feedback control with reference to FIG. 3, which schematically illustrates a block diagram of a SOC feedback control according to an embodiment of the present disclosure. However, it should be appreciated that the present disclosure is not limited thereto; instead, it is also possible to adopt any other SOC feedback control scheme.

The smoothed power from the filter is already shown as in equation (1), which is expressed in s domain through Laplace transform. As mentioned above, the expected reference value for BESS output power is the difference between the desired smoothed power from the filter and the real wind power, and from equation 1, it may be represented by $$P_{Bref1}(t) = \quad \text{(Equation 3)}$$
$$P_{set}(t) - P_w(t) = \frac{1}{1+sT}P_w(t) - P_w(t) = \frac{-sT}{1+sT}P_w(t)$$

The estimated BESS energy change is the integration of its charging and discharging power and thus it can be expressed by:

$$E_{est}(s) = -\frac{P_{Bref1}(t)}{s} = \frac{T}{1+sT}P_w(t) \quad \text{(Equation 4)}$$

wherein a negative power means charging of the BESS and a positive power means discharging of the BESS.

If the BESS inner loss is ignored and the efficiency is taken as 100%, the relationship between energy state and the smoothed power may be expressed by:

$$E_{est}(s) = TP_{set}(t) \quad \text{(Equation 5)}$$

From the above deduction, it can be seen that if the combined power out $P_d$ is to accord with the reference power $P_{set}$ from the filter, then the curve for the variation of energy $E_{set}$ should be T times larger than the curve of $P_{set}(t)$ (T is the smooth time constant of the filter used in output power filtering as mentioned hereinabove), as illustrated in equation 4.

Hence, as mentioned hereinabove, $T = E_{Bn}/C_{WF}$ is considered to be a suitable smooth time constant for the rated BESS capacity, wherein $E_{Bn}$ denotes the BESS rated capacity and $P_{Wn}$ denotes the wind farm rated power. If T is set too high, e.g., $T > E_{Bn}/C_{WF}$, then the commanded energy from the battery may exceed its rated energy capacity. Therefore, a parameter α (0<α<1), which may be called as battery output energy limit factor, may be introduced to limit the commanded energy within the rated BESS capacity and to limit the SOC within in the allowed range.

If the allowed SOC range is defined between the lower limit $m_1$ and upper limit $m_2$, which are the minimum energy percentage limit and the maximum energy percentage limit of the BESS. The value of α can be obtained by $$\alpha = \frac{E_{Bn}(m_2 - m_1)}{TC_{WF}} \quad \text{(Equation 6)}$$

Thus, it should readjust the reference value for the BESS with an adjustment amount expressed by.

$$h(t) = 1/T[E(t) - E_{Bn}m_1 - \alpha TP_{set}(t)] \quad \text{(Equation 7)}$$

Considering the power flow direction of the BESS, positive h(t) represents the discharge of the BESS while negative h(t) represents the charge of the BESS.

For a better understanding of the present disclosure, the physical interpretation is provided as follows. When the BESS is in a high energy state, which means the actual available energy is above $\alpha TP_{set}(t)$, h(t) is positive, indicating the BESS needs to be discharged more or less charged in such situation. In contrast, when the BESS is of low energy state, h(t) is negative, which means the BESS needs to be less discharged or to be charged more.

After the adjustment with h(t), the reference value for the BESS is modified from the initial reference power $P_{Bref1}(t)$ to $P_{Bref2}(t)$ which may be expressed by $$P_{Bref2} = P_{Bref1} + h(t) \quad \text{(Equation 8)}$$

Further, at step S103, the reference output power for the energy storage system may be further adjusted based on a change in predicted wind power output change at the next time point.

It may be understood that the wind power fluctuations usually have some emergency situations such as a large drop in the wind power output (called as "wind abandoned" hereinafter) and a large increase in wind power output (called as "wind forthcoming" hereinafter), which could bring severe impacts on the grid stability. Therefore, it is usually preferred if the BESS could provide power support in such situations by being discharged more in time of the "wind abandoned, or being charged more in time of the "wind forthcoming". However, due to the BESS power output amplitude limit, in time of such severe fluctuating emergent situations, usually no sufficient BESS power can be provided. One possible scheme for solving this problem is to choose another BESS of a higher rated power, but this will greatly increase the cost and will be a waste because in common situations, only small BESS power is required.

In the present disclosure, there is proposed an advanced approach according to which, the BESS will react in advance. Different from the scheme mentioned above, the SOC of the BESS will be adjusted beforehand dependent on prediction of the future output wind power. In the proposed approach, prior to the fluctuating emergent situation, the BESS will be charged more in advance to cope with the "wind abandoned" situation and be discharged more for the "wind forthcoming" situation. As a result, the abrupt change in output power might be alleviated and even avoided and it is possible to provide a smooth transition in power output in these emergency cases and at the same time it requires no higher rated BESS power, which can reduce the BESS cost substantially.

In embodiments of the present disclosure, many different types of wind power prediction approaches could be used, which can be selected by the skilled in the art dependent on application requirements. Moreover, for different applications, it can conduct a wind power prediction in different time scales and accuracy. The root-mean-square error of short time prediction within 1 hour could be reduced to less than 10%; 1 min wind power prediction could be adopted and the error could be ignored.

Figure 4:
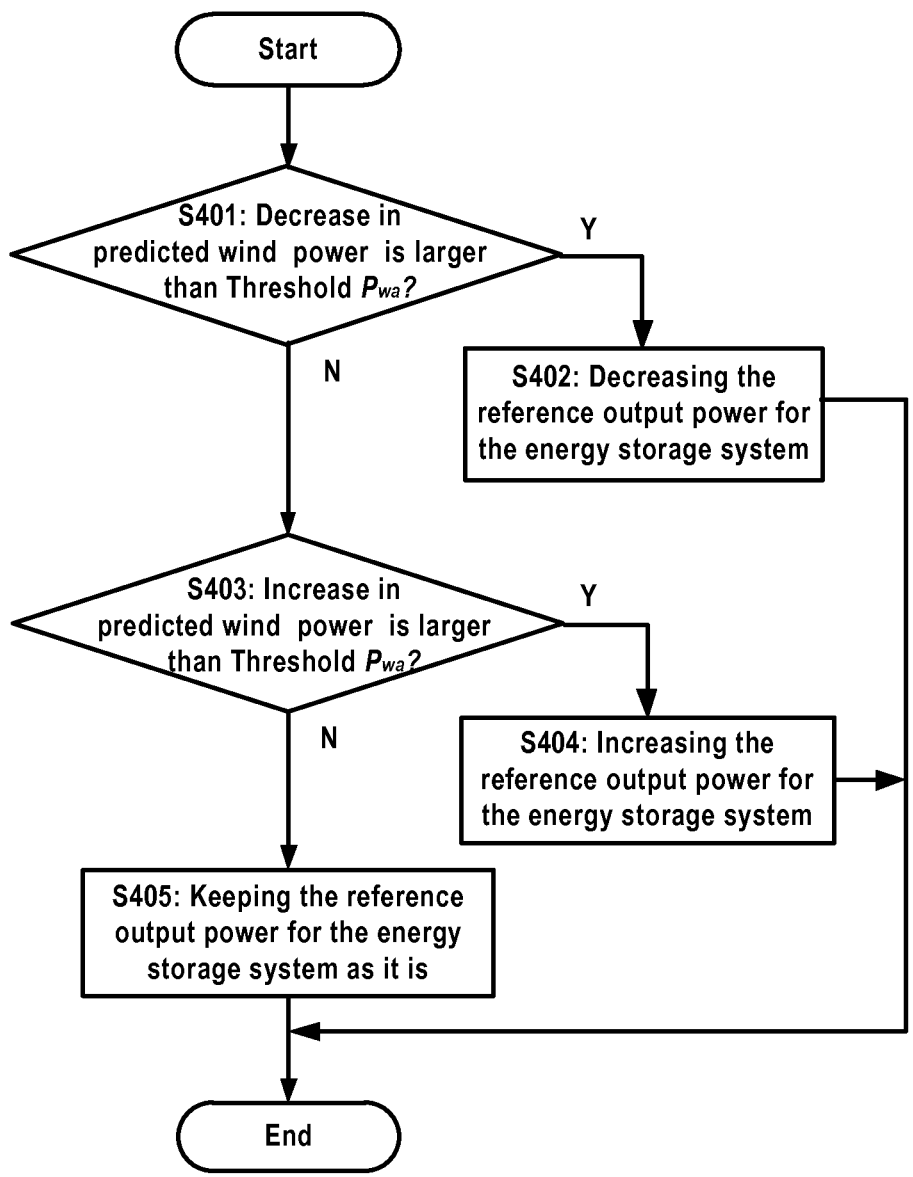
FIG. 4 schematically illustrates a flow chart of a wind power prediction adjustment according to an embodiment of the present disclosure.

Next reference is made to FIG. 4, which schematically illustrates a flow chart of a wind power prediction adjustment according to an embodiment of the present disclosure. As illustrated in FIG. 4, first as step S401, according to results of the wind power prediction, it is determined whether a decrease in predicted wind power is larger than the decrease threshold $P_{wa}$. If yes, it means there will be a "wind abandoned" at time t+1 and thus at step S402, the reference output power for the BESS is decreased to decrease the output power to delivered to the gird at time t, and for example, the BESS shall be charged at the possible maximum charge rate under various limits. On the other hand, if the decrease in predicted wind power is not beyond the decrease threshold $P_{wa}$, the method proceeds with step S403. At step S403, determination is further made as to whether an increase in predicted wind power is larger than the increase threshold $P_{wa}$. If yes, it means there will be a "wind forthcoming" at time t+1 and thus at step S404, the reference output power for the BESS is increased to increase the output power to delivered to the gird at time t. For example, the BESS shall be discharged at the possible maximum discharge rate under various limits. If the change in predicted wind power is fallen within the increase and decrease thresholds, then at step S405 it may keep the reference output power for the energy storage system as it is without making any adjustment.

Hereinafter, only for a purpose of illustration, an exemplary implementation will be made to make the skilled in the art well understand the point of wind power prediction adjustment.

For the reference power output $P_{Bref2}$, the corresponding reference output power delivered to the gird by the wind power generation system (i.e., the combined power from both the wind farm and the BESS) can be expressed by $$P_{dref}(t)=P_{Bref2}(t)+P_W(t). \quad \text{(Equation 9)}$$

The reference output power $P_{dref}(t)$ might be constrained by various limits but in an embodiment of the present disclosure, the reference output power Pdref(t) is mainly constrained by 1 min ramping rate limit $P_{d1minL}$, and BESS output power amplitude limit. The constraints may be expressed by:

1 min ramping rate limit:

$$P_d(t-1)-P_{d1minL}<P_{dref}(t)<P_d(t-1)+P_{d1minL}$$

BESS output power amplitude limit:

$$P_w(t)-P_{Bmax}<P_{dref}(t)<P_w(t)+P_{Bmax}$$

Therefore, when there is a sudden drop in the output wind power, i.e., in time of "wind abandoned," the BESS reference can be adjusted in accordance with the possible maximum charge rate under the two limits as $$P_{Bref3}=\max\{(P_d(t-1)-P_{d1minL}),(P_w(t)-P_{Bmax})\}-P_w(t) \quad \text{(Equation 10)}$$

i.e., the difference between the maximum of the minimum allowable total power outputs (i.e., the minimum allowable power outputs from wind farm and the ESS) under power output ramping rate limit and under energy storage system output power amplitude limit and the actual wind power output. Similarly, when there is a sudden increase in the output wind power, i.e., in time of "wind forthcoming," the BESS reference output power can be adjusted as the possible maximum discharge rate under the two limits, $$P_{Bref3}=\min\{(P_d(t-1)+P_{d1minL}),(P_w(t)+P_{Bmax})\}-P_w(t) \quad \text{(Equation 11)}$$

i.e., the difference between the minimum of the maximum allowable total power outputs (i.e., the maximum allowable power outputs from wind farm and the ESS) under power output ramping rate limit and under energy storage system output power amplitude limit and the actual wind power output. In such a way, the abrupt change due to forthcoming wind power fluctuations may be compensated in advance, which make it possible to provide a smoother transition in power output.

In further embodiments of the present disclosure, the determined BESS reference output power may be further adjusted based on other factors, which will be described in details with reference to FIG. 5.

Figure 5:
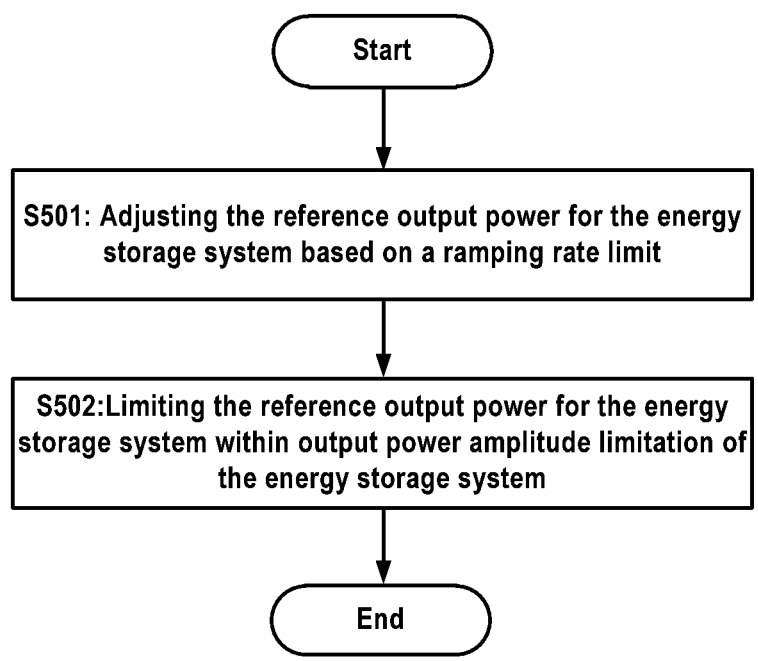
FIG. 5 schematically illustrates a flow chart of a method for determining a reference output power for an ESS in a wind power generation system according to another embodiment of the present disclosure.

As illustrated in FIG. 5, at step S501, the BESS reference output power may be further adjusted based on a ramping rate limit. The ramping rate control will ensure the ramping rate of the final power output $P_d$ is within the limit of the grid code. This control can be conducted by detecting the 1 min change rate and 10 min change rate of the $P_{dref}(t)$ (a reference output power determined based on the previously determined BESS reference output power such as $P_{Bref3}$), determining whether there is any change rate going beyond the stipulated 1-min and 10 min limits $P_{d1minL}$, $P_{d10minL}$, and limiting it within in the limit.

Figure 6:
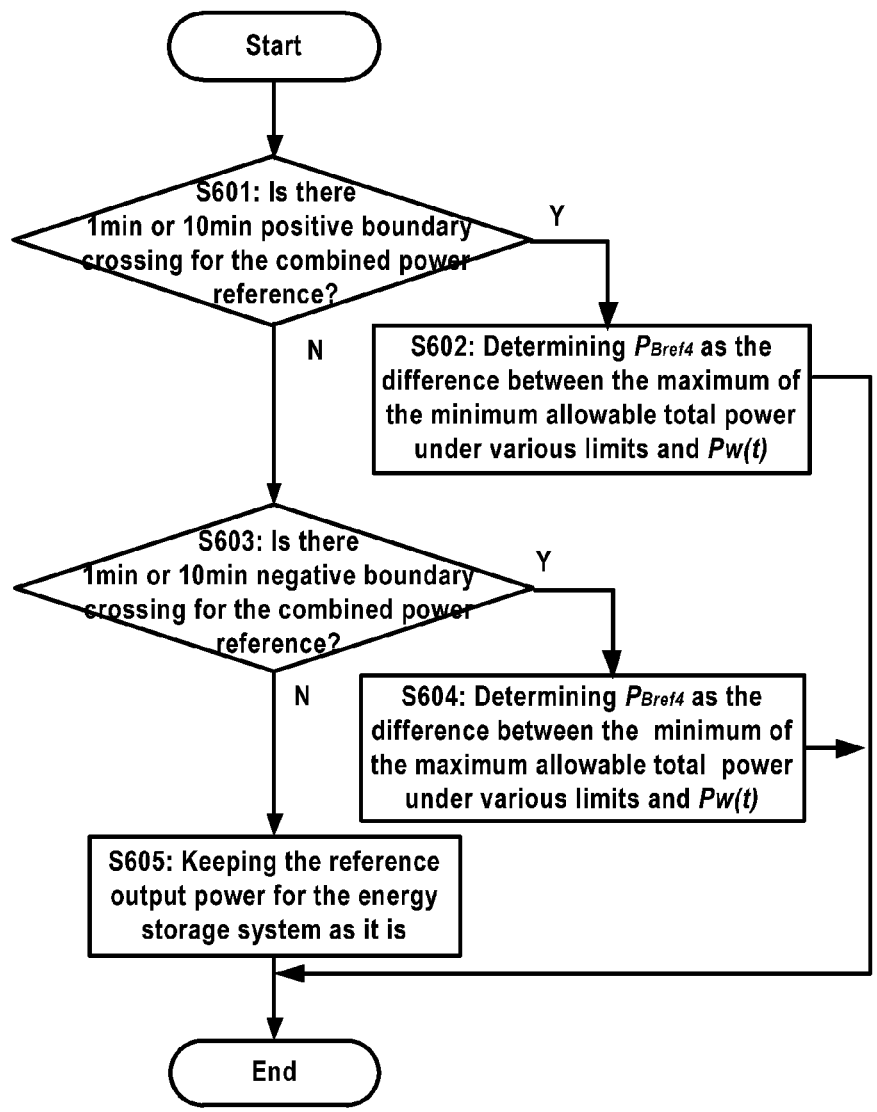
FIG. 6 schematically illustrates a flow chart of ramping rate control according to an embodiment of the present disclosure.

Only for a purpose of illustration, FIG. 6 schematically illustrates a flow chart of ramping rate control according to an embodiment of the present disclosure. As illustrated, first at step S601, it is determined whether there is 1 min or 10 min positive boundary crossing for the combined power reference, i.e, whether the increase in the final power output $P_{dref}$ goes beyond the limit of the grid code. If yes, the BESS reference output power will be determined in accordance with the possible maximum discharge rate under various limits.

In an embodiment of the present disclosure, the considered limits comprise 1 min ramping rate limit, 10 min ramping rate limit and BESS output power amplitude limit, which may be determined as follows:

1 min ramping rate limit:

$$P_d(t-1)-P_{d1minL}<P_{dref}(t)<P_d(t-1)+P_{d1minL}$$

10 min ramping rate limit:

$$P_{d10max}(t)-P_{d10minL}<P_{dref}(t)<P_{d10min}(t)+P_{d10minL}$$

wherein $P_{d10max}(t)=\max\{P_d(t-1),P_d(t-2),\ldots P_d(t-10)\}$ $$P_{d10min}(t)=\min\{P_d(t-1),P_d(t-2),\ldots P_d(t-10)\}$$

BESS output power amplitude limit:

$$P_w(t)-P_{Bmax}<P_{dref}(t)<P_w(t)+P_{Bmax}$$

Thus, for a positive boundary crossing, the BESS reference output power may be determined as $$P_{Bref4}=\min\{(P_d(t-1)+P_{d1minL}),(P_{d10min}(t)+P_{d10minL}),(P_w(t)+P_{Bmax})\}-P_w(t).$$

That is to say, in such a case, the reference output power for the energy storage system can be adjusted as the difference between the minimum of maximum allowable total power outputs (i.e., the maximum allowable power output from wind farm and the ESS) under one-minute power output ramping rate limit, ten-minute power output ramping rate limit and energy storage system output power amplitude limit and the actual wind power output.

On the other hand, if there is no 1 min or 10 min positive boundary crossing for the combined power reference $P_d$, the method goes to step S603. At step S603, it is further determined whether there is 1 min or 10 min negative boundary crossing for the combined power reference $P_d$, i.e., whether the decrease in the final power output $P_d$ goes beyond the limit of the grid code. If yes, the BESS reference output power will be determined in accordance with the possible maximum charge rate under various limits. For example, for a negative boundary crossing, the BESS reference output power may be determined as $$P_{Bref4}=\max\{(P_d(t-1)-P_{d1minL}),(P_{d10max}(t)-P_{d10minL}),(P_w(t)-P_{Bmax})\}-P_w(t).$$

In other words, in such a situation, the reference output power for the energy storage system may be adjusted as the difference between the maximum of the minimum allowable total power outputs (i.e., the minimum power output from wind farm and the ESS) under one-minute power output ramping rate limit, ten-minute power output ramping rate limit and energy storage system output power amplitude limit and the actual wind power output.

If both ramping rate in 1 min and 10 min ramping rate comply with the requirement of grid code, then at step S605, it may keep the reference output power for the energy storage system as it is without making any adjustment. In such a way, it is possible to make sure that the ramping rate complies with the required gird code.

Furthermore, at step S502, the adjusted reference output power may be further adjusted based on the BESS output power amplitude limit so as to limit the BESS output power within the predetermine limits.

For example, it may first be determined whether the previously determined BESS reference output power such as $P_{Bref4}(t)$ is fallen within a power range from $-P_{Bmax}$ to $P_{Bmax}$. If the $P_{Bref4}(t)$ is higher than the $P_{Bmax}$, then the $P_{Bref4}(t)$ can be limited to $P_{Bmax}$; if the $P_{Bref4}(t)$ is lower than the $P_{Bmax}$, the $P_{Bref4}(t)$ can be limited to $-P_{Bmax}$. Thus, by means of BESS output power amplitude limit, it can ensure that the determined BESS reference output power does not go beyond the BESS output power amplitude limit.

To make the skilled in the art to better understand the idea of the present disclosure, hereinafter, reference will further be made to FIG. 7 to describe a method for determining a reference power for an ESS in a wind power generation system according to a specific implementation of the present disclosure.

Figure 3:
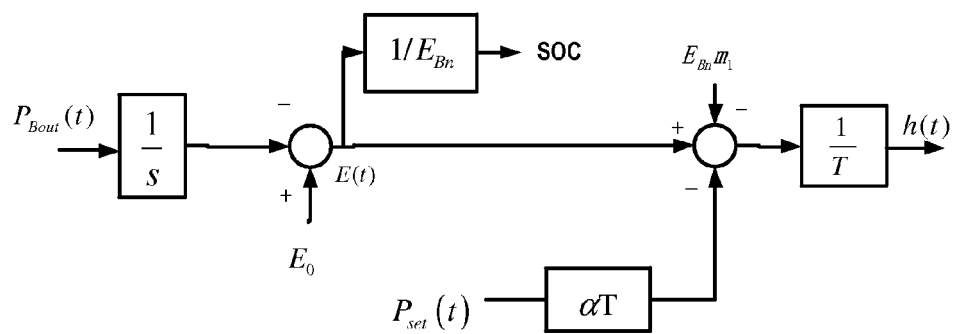
FIG. 3 schematically illustrates a block diagram of a SOC feedback control according to an embodiment of the present disclosure.
Figure 7:
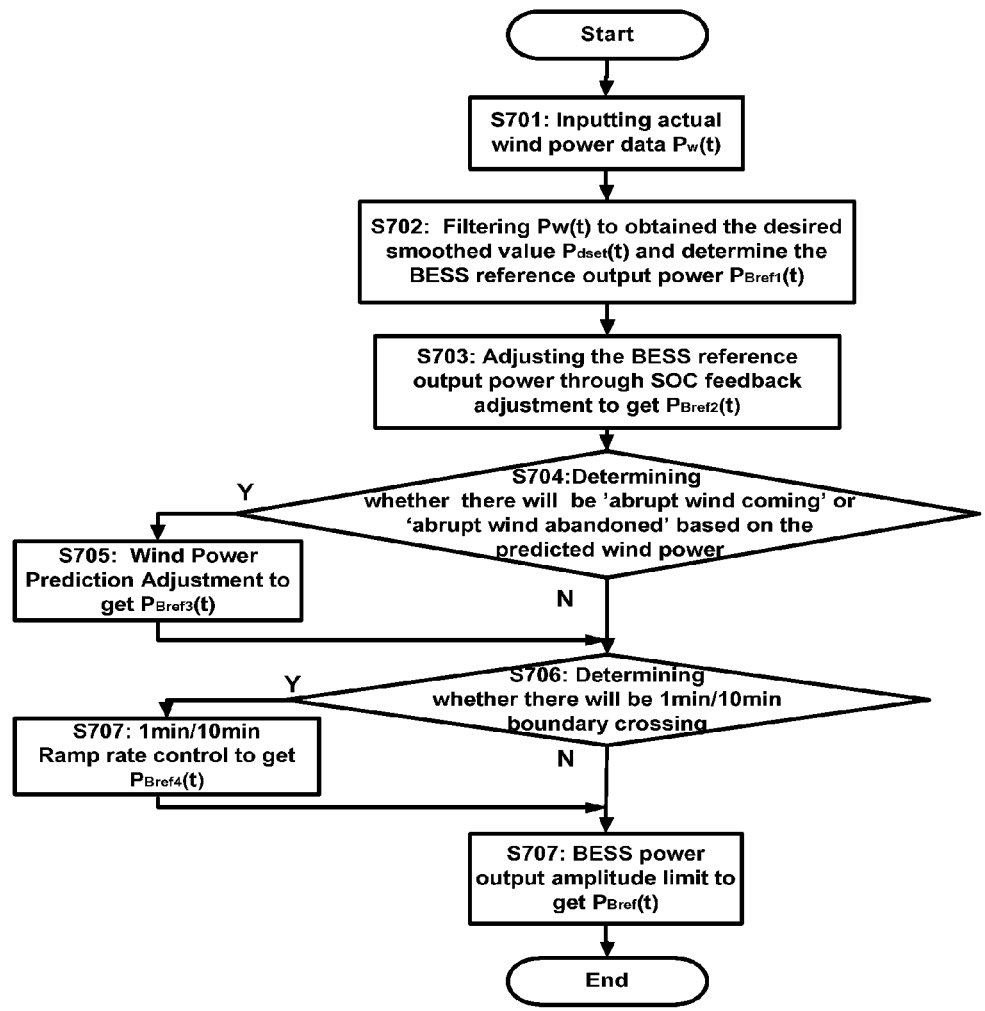
FIG. 7 schematically illustrates a flow chart of a method for determining a reference power for an ESS in a wind power generation system according to a specific implementation of the present disclosure.

As illustrated in FIG. 7, first as step S701, actual wind power data $P_{w(t)}$ is inputted into a control system and then at step S702, the actual wind power data $P_{w(t)}$ is filtered by for example a first-order low pass filter to obtain a desired value $P_{dset(t)}$ for power output delivered to a grid. Then the BESS reference output power $P_{Bref1}(t)$ is determined from the actual wind power data $P_{w(t)}$ and a desired value $P_{dset(t)}$, for example as the difference between the actual wind power data $P_{w(t)}$ and the desired value $P_{dset(t)}$. Next, the BESS reference output power $P_{Bref1}(t)$ may be adjusted through SOC feedback adjustment to get $P_{Bref2}(t)$, which may be performed for example in term of the scheme as illustrated in FIG. 3. After that, at step S704, it is determined whether there will be "wind forthcoming" or "wind abandoned" based on the predicted power wind. If there is an abrupt change in predicted power wind, then at step S705 the wind power prediction adjustment may be performed to get adjusted BESS reference output power $P_{Bref3}(t)$ for example in accordance with the scheme as illustrated in FIG. 4 and the method proceeds with step S706; otherwise, the method proceeds with step S706 directly. At step S706, it is further determined whether there will be 1 min or 10 min ramping rate boundary crossing. If there will be such a boundary crossing, 1 min/10 min ramping rate control is performed at step S707 to get newly adjusted BESS $P_{Bref4}(t)$ for example according to the scheme as described with reference to FIG. 6 and the method goes to Step S707; otherwise, the method goes to step S707 directly. At step S707, the BESS reference output power is further limited so that it can make sure that the BESS reference output power complies with the BESS power output power amplitude limit, thereby obtaining the final BESS reference output power.

In embodiments of the present disclosure, before performing any adjustment, the actual wind power output is first filtered to obtain a reference power output delivered to a grid; based on the actual wind power output and the obtained reference power output, the reference output power for the energy storage system is determined; and afterwards the reference output power for the energy storage system is adjusted based on a change in predicted wind power output at the next time point. In some embodiments, the reference output power for the energy storage system may be further adjusted based on other factors. In this way, it can provide a direct control strategy for smoothing wind farm output fluctuations and limiting power ramping rate within required range, which is more practically feasible than the existing strategies and could result in better control performance.

In addition to the method as described hereinabove, there is also provide a control system for determining a reference output power for an energy storage system in the wind power generation system. Afterwards, reference will be made to FIG. 8 to describe a device for determining a reference power for an ESS in a wind power generation system according to an embodiment of the present disclosure.

Figure 8:
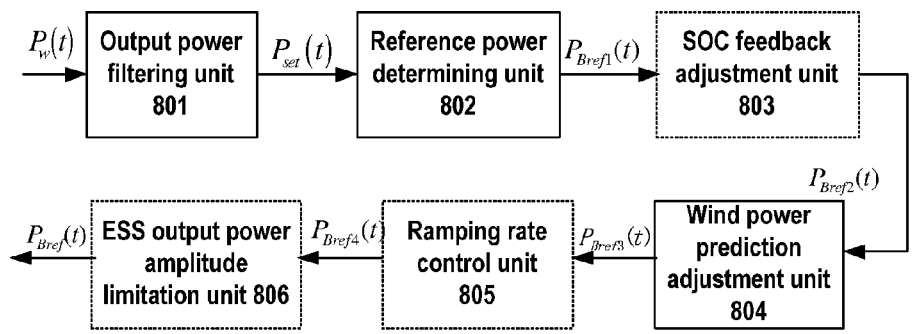
FIG. 8 schematically illustrates a block diagram of a device for determining a reference power for an ESS in a wind power generation system according to an embodiment of the present disclosure.

In FIG. 8 is illustrated a device 800 for determining a reference output power for an energy storage system in the wind power generation system. As illustrated in FIG. 8, the device 800 comprises an output power filtering unit 801, a reference power determining unit 802, and a wind power prediction adjustment unit 804. The output power filtering unit 801 is configured to filter an actual wind power output $P_w(t)$ to obtain a desired power output $P_{set}(t)$ delivered to a grid. The reference power determination unit 802 is configured to determine a reference output power $P_{Bref1}(t)$ for the energy storage system from the actual wind power output $P_w(t)$ and the desired power output $P_{set}(t)$ delivered to the grid. The power prediction adjustment unit 804 is configured to adjust the reference output power for the energy storage system based on a change in predicted wind power output at the next time point.

Before adjusting by the wind power prediction adjustment unit, the reference output power $P_{Bref1}(t)$ for the energy storage system may be first adjusted by an SOC feedback adjustment unit 803, as illustrated in FIG. 8. The SOC feedback adjustment unit 803 may be configured to modify, before the wind power prediction adjustment unit 804, the reference output power for the energy storage system based on the state of charge of the energy storage system. The adjustment power amount h(t) may be determined by the SOC feedback adjustment unit 803 as $$h(t)=1/T[E(t)-E_{Bn}m_1-\alpha T P_{set}(t)]$$

wherein T denotes a filter time constant for filtering the actual wind power output, E(t) denotes energy remaining in the energy storage system at time t, $E_{BN}$ denotes the rated capacity of the energy storage system, m1 denotes the minimum energy percentage limitation, α denotes a batter energy limit factor, and $P_{set}(t)$ denotes the obtained reference power output delivered to the grid.

In an embodiment of the present disclosure, the power prediction adjustment unit 804 may be further configured to: increase the reference output power for the energy storage system if an increase in the predicted wind power output is larger than a predetermined increase threshold; and/or decrease the reference output power for the energy storage system if a decrease in the predicted wind power output is larger than a predetermined decrease threshold.

In another embodiment of the present disclosure, the power prediction adjustment unit 804 may be configured to increase the reference output power for the energy storage system by determining the reference output power for the energy storage system as the difference between the minimum of the maximum allowable total power outputs under power output ramping rate limit and under energy storage system output power amplitude limit and the actual wind power output.

In a further embodiment of the present disclosure, the power prediction adjustment unit 804 is configured to decrease the reference output power for the energy storage system by determining the reference output power for the energy storage system as the difference between the maximum of the minimum allowable total power outputs under power output ramping rate limit and under energy storage system output power amplitude limit and the actual wind power output.

In a still further embodiment of the present disclosure, it may further comprise a ramping rate control unit 805, which is configured to adjust the reference output power for the energy storage system based on ramping rate limits. Particularly, the ramping rate control unit 805 may be configured to determine the reference output power for the energy storage system as the difference between the maximum of the minimum allowable total power outputs under one-minute power output ramping rate limit, ten-minute power output ramping rate limit and energy storage system output power amplitude limit and the actual wind power output if a negative ramping rate boundary crossing is detected. The ramping rate control unit 805 may be further configured to determine the reference output power for the energy storage system as the difference between the minimum of maximum allowable total power outputs under one-minute power output ramping rate limit, ten-minute power output ramping rate limit and energy storage system output power amplitude limit and the actual wind power output if a positive ramping rate boundary crossing is detected.

Figure 9:
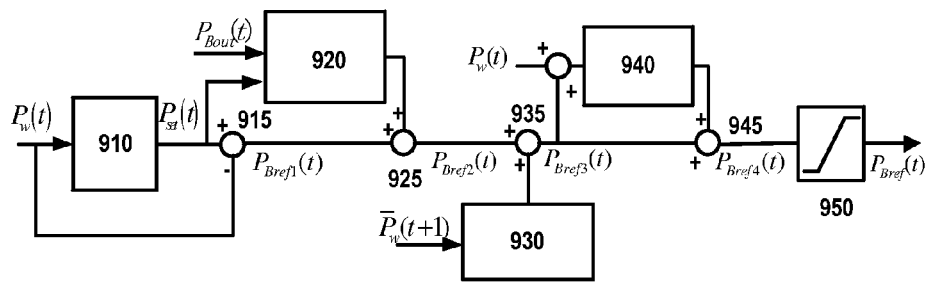
FIG. 9 schematically illustrates a block diagram of a device for determining a reference power for an ESS in a wind power generation system according to a specific implementation of the present disclosure.

In a still yet further embodiment of the present disclosure, the control system 800 may further comprise a power amplitude limit unit 806 configured to limit the reference output power for the energy storage system within output power amplitude limitation of the energy storage system FIG. 9 further schematically illustrates a block diagram of an apparatus for determining a reference power for an ESS in a wind power generation system according to a specific implementation of the present disclosure. As illustrated in FIG. 9, the filtering module 910 filters the actual power data $P_w(t)$ and the smoothed power $P_{set}(t)$ after filtering is input to an adder 915, in which the different between the $P_w(t)$ and the $P_{set}(t)$) is calculated and the difference is taken as the initial BESS reference output power $P_{Bref1}(t)$. The SOC feedback module 920 will receive the output power $P_{Bout(t)}$ of the BESS and calculate an adjustment power amount to be added in adder 925 to the initial BESS reference output power $P_{Bref1}(t)$ to obtained $P_{Bref2}(t)$. Then the wind power prediction module 930 will receive the predicted power output $\bar{P}_v(t+1)$ at the next time t+1 and adjust the $P_{Bref2}(t)$ into $P_{Bref3}(t)$. Afterwards, the ramping rate control module 940 may further adjust the $P_{Bref3}(t)$ based on the ramping rate limits to make sure that the reference power output for the BESS meets the ramping rate requirements and as a result, the $P_{Bref4}(t)$ is obtained. Finally, the $P_{Bref4}(t)$ further goes through BESS output power amplitude limit module 950 so as to limit the amplitude of the reference power output for the BESS within the BESS output power amplitude limit. Thus, the final reference power output $P_{Bref}(t)$ for the BESS is obtained.

Figure 10:
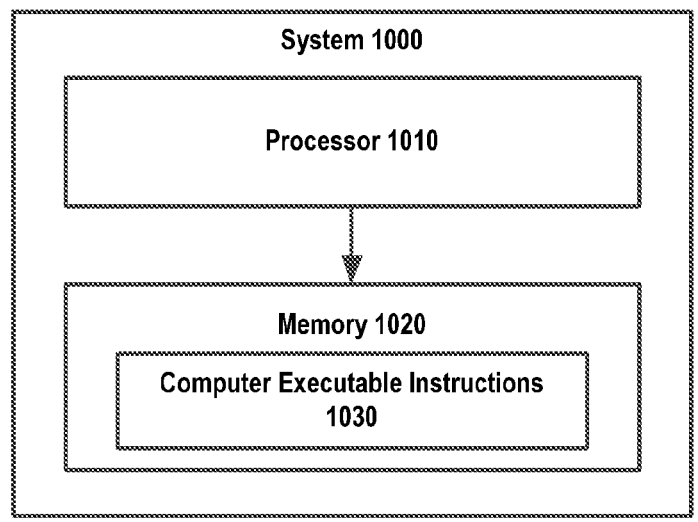
FIG. 10 schematically illustrates a block diagram of a system for determining a reference power for an ESS in a wind power generation system according to an embodiment of the present disclosure.

Additionally, in embodiments of the present disclosure, there is also provided a system for identifying load volatility of a power customer, which will be described with reference to FIG. 10. As illustrated in FIG. 10, the system 1000 may comprise at least one processor 1010 and at least one memory 1020 storing computer executable instructions 1030. The at least one memory 1010 and the computer executable instructions 1030 may be configured to, with the at least one processor 1020, cause the system 1000 to perform the steps of method described with reference to FIGS. 1 to 7.

In embodiments of the present disclosure, there is provided a tangible computer-readable medium having a plurality of instructions executable by a processor to manage loads of a power grid, the tangible computer-readable medium may comprise instructions configured to perform steps of the method according to any embodiments of method of the present disclosure.

It should be noted that operations of respective models or means as comprised in device 800, device 900 and systems 1000, and substantially correspond to respective method steps as previously described. Therefore, for detailed operations of respective models or means in devices 800 and 900 and system 1000, please refer to the previous descriptions of the methods of the present disclosure with reference to FIGS. 1 to 7.

Besides, several simulations are made to validate the effectiveness of the proposed solution. In the simulations, the input power data is initial wind power output with minute resolution from a wind farm with installed capacity of 160 MW; the rated energy capacity and power capacity of the BESS are 50 MWh and 40 MW respectively; and the limitation for 1 min and 10 min power ramping rate is 30 MW/min and 100 MW/10 min.

Figure 11A:
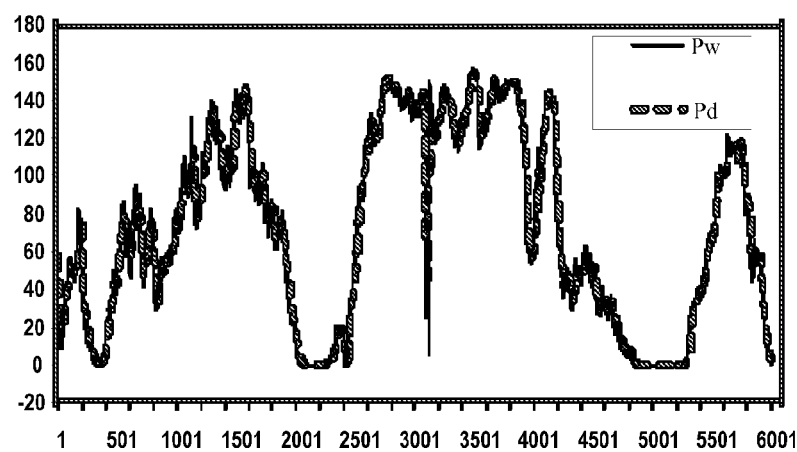
FIGS. 11A & 11B schematically illustrate curves of power output delivered to the gird with and without the proposed solution of the present disclosure.
Figure 11B:
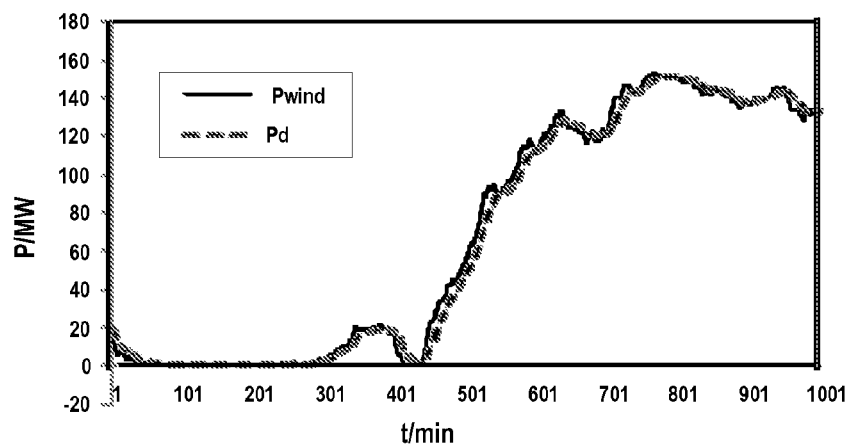

FIGS. 11A & 11B schematically illustrate wind power output before and after adopting the proposed solution. From the figure, it is clear that after smoothing by means of the proposed solution, minor fluctuations have been smoothed and the ramping rate for sudden changes of wind power has been limited. The crossing-limit ramping has been eliminated. If standard deviations for 1 min and 10 min are used as the smoothing indicators, which may be calculated as below:

$$\eta_{1min} = \frac{|\alpha_{1min} - \beta_{1min}|}{\alpha_{1min}} * 100\%$$

$$\eta_{10min} = \frac{|\alpha_{10min} - \beta_{10min}|}{\alpha_{10min}} * 100\%$$

wherein $\alpha_{1min}$ and $\alpha_{10min}$ denote 1-min and 10-minute root mean square of the original wind power fluctuation respectively; $\beta_{1min}$ and $\beta_{10min}$ denotes 1 min and 10 min root mean square of the power output $P_d$ delivered to the power system, respectively; $\eta_{1min}$ and $\eta_{10min}$ indicate 1 min and 10 min smoothing effect of wind power respectively, a larger value indicating a better smoothing effect. The results show that 1 min change rate has been improved by 57% while the 10 min rate has been improved by 38%.

Figure 12:
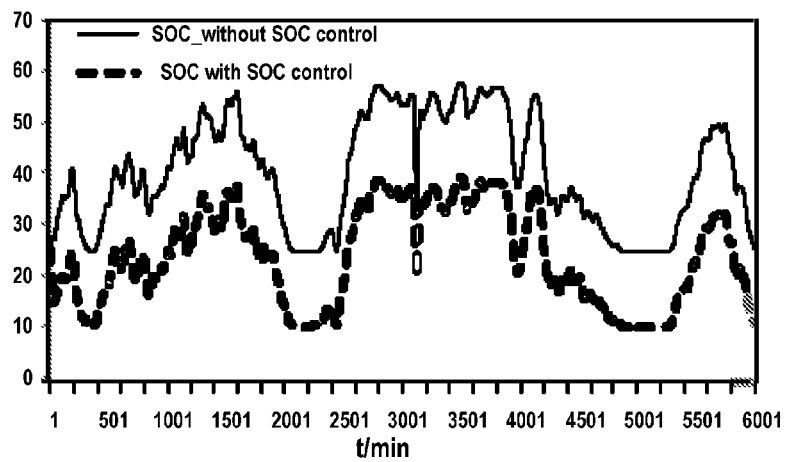
FIG. 12 schematically illustrates curves of battery energy with and without SOC feedback control as proposed in the present disclosure.

In addition, FIG. 12 further illustrates SOC energy variations with/without SOC feedback control according to an embodiment of the present disclosure. From the figure, it is clear that without SOC feedback control, the SOC energy variation has surpassed its upper limit, and thus the smoothing effect can't be reached even with the rated capacity and at the same time capacity below 25 MWh hasn't been utilized. While with SOC feedback control as proposed in the present disclosure, the SOC may be limited within 0.2-0.8 to avoid the over-charge and over-discharge event and to fully use the battery rated capacity.

Hereinafter, Tables 1 and 2 are listed to give output power of the wind farm, the BESS and combined power delivered to the grid from minute 3093 to 3095.

TABLE 1

Effect without the wind power prediction adjustment

| Time/min | Pwind/MW | Pbess-out/MW | Pd/MW |
|---|---|---|---|
| 3093 | 139.85 | 1.5 | 141.35 |
| 3094 | 93.44 | 40 | 133.44 |
| 3095 | 24.57 | 40 | 64.57 |

TABLE 2

Effect with the wind power prediction adjustment

| Time/min | Pwind/MW | Pbess-out/MW | Pd/MW |
|---|---|---|---|
| 3093 | 139.85 | −28.38 | 111.47 |
| 3094 | 93.44 | −11.97 | 81.47 |
| 3095 | 24.57 | 40 | 64.57 |

As shown in Table 1 and Table 2, there is a successive "wind abandoned" at time 3094 and 3095, during which the wind power drops from 139.85 MW to 93.44 MW and then to 24.57 MW. In Table 1, it corresponds to the case without 'wind power prediction adjustment', $P_d$ drops from 141.35 MW to 133.44 MW and then to 64.56 MW. The 1 min ramping rate is larger than the stipulated 30 MW/min. Table 2 shows the case with the wind power prediction adjustment as proposed in the present disclosure, wherein the abandoned wind is known in advance. So at time point 3094, the reference value $P_{Bref}(3094)$ for the BESS output is changed from 40 MW to −11.97 MW, which means the BESS starts to be charged at time point 3094. And Thus $P_d(3094)$ is changed from 133.44 MW to 81.47 MW. With this change, the final output $P_d$ will experience a much smoother transition with a 1 min change rate less than 30 MW/min during the emergency time of "wind abandoned".

By far, the main ideas of the present disclosure have been described with reference to embodiments of the present disclosure and specific implementations, the skilled in the art should appreciate that these descriptions are provided only for a purpose of illustration and the present disclosure is not limited thereto. In fact, many modification or variations could be made without departing the spirit and scope of the present disclosure. For example, from the teaching of the present disclosure, more or less factors may be considered to adjust the reference output power for the energy storage system, some different adjust schemes might be adopted, the orders for adjust the reference output power for the energy storage system might be changed. However, all these changes, modifications, and variations should be fallen with the scope of the present disclosure as soon as they are not departing the spirit of the present disclosure.

Figure 13:
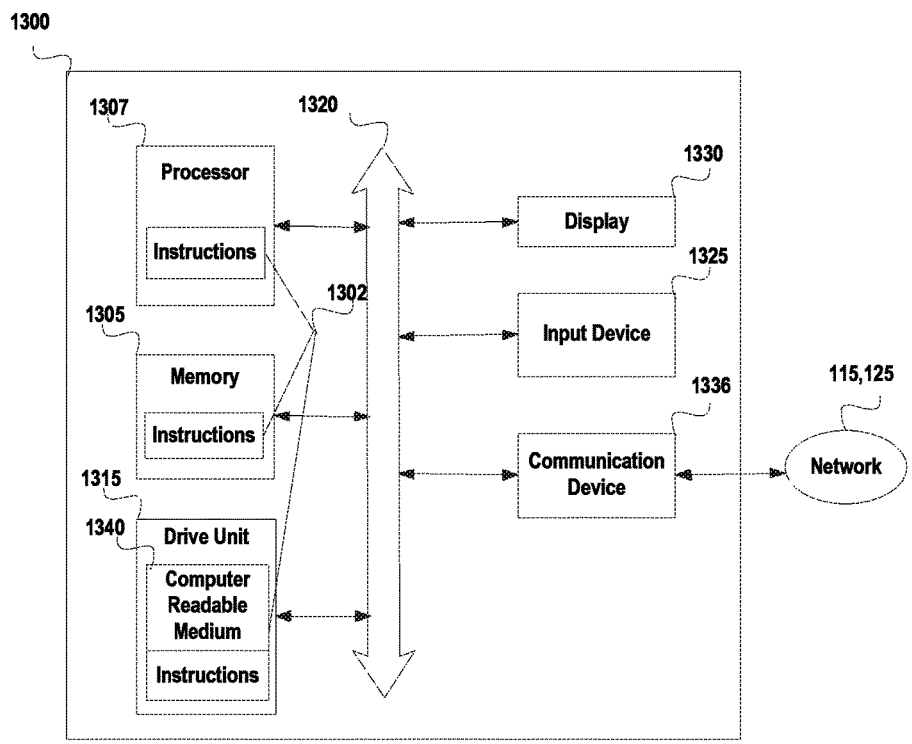
FIG. 13 schematically illustrates a general computer system, programmable to be a specific computer system, which may represent any of the computing devices referenced herein.

FIG. 13 illustrates a general computer system 1300, which may represent any of the computing devices referenced herein. For instance, the general computer system 1300 may represent—in part or in its entirety—the control center, the head end, the integrated network operations and management system (NOMS), the fault, performance, and configuration management (FPCM) module, or any other computing devices referenced herein such as the end devices, the meters, the telemetry interface units (TIUs), the collectors, and/or any networked components such as routers, switches or servers as discussed herein. The computer system 1300 may include an ordered listing of a set of instructions 1302 that may be executed to cause the computer system 1300 to perform any one or more of the methods or computer-based functions disclosed herein. The computer system 1300 may operate as a stand-alone device or may be connected, e.g., using the network 115, 125, to other computer systems or peripheral devices.

In a networked deployment, the computer system 1300 may operate in the capacity of a server or as a client-user computer in a server-client user network environment, or as a peer computer system in a peer-to-peer (or distributed) network environment. The computer system 1300 may also be implemented as or incorporated into various devices, such as a personal computer or a mobile computing device capable of executing a set of instructions 1302 that specify actions to be taken by that machine, including and not limited to, accessing the network 115, 125 through any form of browser. Further, each of the systems described may include any collection of sub-systems that individually or jointly execute a set, or multiple sets, of instructions to perform one or more computer functions.

The computer system 1300 may include a processor 1307, such as a central processing unit (CPU) and/or a graphics processing unit (GPU). The processor 1307 may include one or more general processors, digital signal processors, application specific integrated circuits, field programmable gate arrays, digital circuits, optical circuits, analog circuits, combinations thereof, or other now known or later-developed devices for analyzing and processing data. The processor 1307 may implement the set of instructions 1302 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility with computer processing or networked communication.

The computer system 1300 may include a memory 1305 on a bus 1320 for communicating information. Code operable to cause the computer system to perform any of the acts or operations described herein may be stored in the memory 1305. The memory 1305 may be a random-access memory, read-only memory, programmable memory, hard disk drive or any other type of volatile or non-volatile memory or storage device.

The computer system 1300 may also include a disk, solid-state drive optical drive unit 1315. The disk drive unit 1315 may include a non-transitory or tangible computer-readable medium 1340 in which one or more sets of instructions 1302, e.g., software, can be embedded. Further, the instructions 1302 may perform one or more of the operations as described herein. The instructions 1302 may reside completely, or at least partially, within the memory 1305 and/or within the processor 1307 during execution by the computer system 1300. The database or any other databases described above may be stored in the memory 1305 and/or the disk unit 1315.

The memory 1305 and the processor 1307 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 1300 may include an input device 1325, such as a keyboard or mouse, configured for a user to interact with any of the components of system 1300, including user selections or menu entries of display menus. It may further include a display 1330, such as a liquid crystal display (LCD), a cathode ray tube (CRT), or any other display suitable for conveying information. The display 1330 may act as an interface for the user to see the functioning of the processor 1307, or specifically as an interface with the software stored in the memory 1305 or the drive unit 1315.

The computer system 1300 may include a communication interface 1336 that enables communications via the communications network 125. The network 125 may include wired networks, wireless networks, or combinations thereof. The communication interface 1336 networks may enable communications via any number of communication standards, such as Ethernet AVB, 802.11, 802.13, 802.20, WiMax, or other communication standards.

Accordingly, the system may be realized in hardware, software, or a combination of hardware and software. The system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

As described herein, any modules or processing boxes are defined to include software, hardware or some combination thereof executable by the processor 1307. Software modules may include instructions stored in the memory 1305, or other memory device, that are executable by the processor 1307 or other processors. Hardware modules may include various devices, components, circuits, gates, circuit boards, and the like that are executable, directed, and/or controlled for performance by the processor 1307.

The system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

By far, the present disclosure has been described with reference to the accompanying drawings through particular preferred embodiments. However, it should be noted that the present disclosure is not limited to the illustrated and provided particular embodiments, but various modification may be made within the scope of the present disclosure.

Further, the embodiments of the present disclosure can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may appreciate that the above method and system can be implemented with a computer-executable instructions and/or control codes contained in the processor, for example, such codes provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry, for example, a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software, for example, by firmware.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

What is claimed is:

1. A method of determining a reference output power for an energy storage system in a wind power generation system, comprising
filtering an actual wind power output to obtain a desired power output delivered to a grid;
determining a reference output power for the energy storage system from the actual wind power output and the desired power output delivered to the grid;
adjusting the reference output power for the energy storage system based on a change in predicted wind power output at a next time point; and
wherein the adjusting includes increasing the reference output power for the energy storage system by determining a difference between the actual wind power output and a minimum of the following two parameters: (1) a maximum allowable total power outputs under power output ramping rate limit and (2) a maximum allowable total power outputs under energy storage system output power amplitude limit.

2. The method of claim 1, wherein the adjusting the reference output power for the energy storage system based on a change in predicted wind power output at the next time point comprises any one of
increasing the reference output power for the energy storage system if an increase in the predicted wind power output is larger than a predetermined increase threshold; and
decreasing the reference output power for the energy storage system if a decrease in the predicted wind power output is larger than a predetermined decrease threshold.

3. The method of claim 2, wherein the decreasing the reference output power for the energy storage system further comprises
determining the reference output power for the energy storage system as a difference between a maximum of a minimum allowable total power outputs under power output ramping rate limit and under energy storage system output power amplitude limit and the actual wind power output.

4. The method of claim 1, further comprising:
adjusting the reference output power for the energy storage system based on a ramping rate limit.

5. The method of claim 4, wherein the adjusting the reference output power for the energy storage system based on a ramping rate limit further comprises
determining the reference output power for the energy storage system as a difference between a maximum of a minimum allowable total power outputs under one-minute power output ramping rate limit, ten-minute power output ramping rate limit and energy storage system output power amplitude limit and the actual wind power output if a negative ramping rate boundary crossing is detected.

6. The method of claim 4, wherein the adjusting the reference output power for the energy storage system based on a ramping rate limit further comprises:
determining the reference output power for the energy storage system as a difference between a minimum of a maximum allowable total power outputs under one-minute power output ramping rate limit, ten-minute power output ramping rate limit and energy storage system output power amplitude limit and the actual wind power output if a positive ramping rate boundary crossing is detected.

7. The method of claim 1, further comprising:
modifying, before adjusting the reference output power for the energy storage system, the reference output power for the energy storage system with a power value h(t) expressed by $$h(t)=1/T[E(t)-E_{Bn}m_1-\alpha TP_{set}(t)]$$

wherein T denotes a filter time constant for filtering the actual wind power output, E(t) denotes energy remaining in the energy storage system at time t, $E_{Bn}$ denotes a rated capacity of the energy storage system, $m_1$ denotes a minimum energy percentage limitation, $\alpha$ denotes a battery energy limit factor, and $P_{set}$ (t) denotes the desired power output delivered to the grid.

8. The method of claim 1, further comprising:
limiting the reference output power for the energy storage system within output power amplitude limitation of the energy storage system.

9. A device for determining a reference output power for an energy storage system in a wind power generation system, comprising
a power output filtering unit configured to filter an actual wind power output to obtain a desired power output delivered to a grid;
a reference power determination unit configured to determine a reference output power for the energy storage system from the actual wind power output and the desired power output delivered to the grid; and
a power prediction adjustment unit configured to adjust the reference output power for the energy storage system based on a change in predicted wind power output at a next time point;
wherein the power prediction adjustment unit is configured to increase the reference output power for the energy storage system by determining a difference between the actual wind power output and a minimum of the following two parameters: (1) a maximum allowable total power outputs under power output ramping rate limit and (2) a maximum allowable total power outputs under energy storage system output power amplitude limit.

10. The device of claim 9, wherein the power prediction adjustment unit is further configured to:
increase the reference output power for the energy storage system if an increase in the predicted wind power output is larger than a predetermined increase threshold; and/or
decrease the reference output power for the energy storage system if a decrease in the predicted wind power output is larger than a predetermined decrease threshold.

11. The device of claim 10, wherein the power prediction adjustment unit is configured to decrease the reference output power for the energy storage system by
determining the reference output power for the energy storage system as a difference between a maximum of a minimum allowable total power outputs under power output ramping rate limit and under energy storage system output power amplitude limit and the actual wind power output.

12. The device of claim 9, further comprising:
a ramping rate control unit configured to adjust the reference output power for the energy storage system based on a ramping rate limit.

13. The device of claim 12, wherein the ramping rate control unit is configured to
determine the reference output power for the energy storage system as a difference between a maximum of a minimum allowable total power outputs under one-minute power output ramping rate limit, ten-minute power output ramping rate limit and energy storage system output power amplitude limit and the actual wind power output if a negative ramping rate boundary crossing is detected.

14. The device of claim 12, wherein the ramping rate control unit is configured to:
determine the reference output power for the energy storage system as a difference between a minimum of a maximum allowable total power outputs under one-minute power output ramping rate limit, ten-minute power output ramping rate limit and energy storage system output power amplitude limit and the actual wind power output if a positive ramping rate boundary crossing is detected.

15. The device of claim 9, further comprising:
a state of charge adjustment unit configured to modify, before adjusting the reference output power for the energy storage system, the reference output power for the energy storage system with a power value h(t) expressed by $$h(t)=1/T[E(t)-E_{Bn}m_1-\alpha TP_{set}(t)]$$

wherein T denotes a filter time constant for filtering the actual wind power output, E(t) denotes energy remaining in the energy storage system at time t, $E_{BN}$ denotes a rated capacity of the energy storage system, m1 denotes a minimum energy percentage limitation, a denotes a battery energy limit factor, and $P_{set}(t)$ denotes the desired power output delivered to the grid.

16. The device of claim 9, further comprising:
a power amplitude limit unit configured to limit the reference output power for the energy storage system within output power amplitude limitations of the energy storage system.

* * * * *